(12) United States Patent
Shukla et al.

(10) Patent No.: US 9,608,832 B1
(45) Date of Patent: Mar. 28, 2017

(54) SYNCHRONIZATION BETWEEN CONFERENCE AND CALENDAR SYSTEMS

(75) Inventors: Sachin Shukla, Santa Clara, CA (US); Nam Do, Pleasanton, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

(21) Appl. No.: 13/172,764

(22) Filed: Jun. 29, 2011

(51) Int. Cl.
| | | |
|---|---|---|
| *G06F 15/16* | (2006.01) | |
| *H04L 12/18* | (2006.01) | |
| *H04L 29/06* | (2006.01) | |
| *H04M 3/56* | (2006.01) | |
| *G06F 17/30* | (2006.01) | |
| *G06Q 10/10* | (2012.01) | |

(52) U.S. Cl.
CPC .... *H04L 12/1818* (2013.01); *G06F 17/30174* (2013.01); *H04L 65/403* (2013.01); *H04M 3/56* (2013.01); *G06Q 10/10* (2013.01)

(58) Field of Classification Search
CPC ......... H04L 29/06414; H04L 29/08945; H04L 65/1066; H04L 12/1818; H04L 65/1069; H04L 65/403; H04L 67/2809; H04M 3/56; G06Q 10/10; G06Q 10/02; G06Q 10/1093; G06F 17/30174
USPC ... 709/206, 204, 208, 248, 222; 379/202.01; 370/261
See application file for complete search history.

(56) References Cited

U.S. PATENT DOCUMENTS

| | | | |
|---|---|---|---|
| 7,747,458 B2* | 6/2010 | Lyle et al. .................... | 705/7.19 |
| 2003/0158900 A1* | 8/2003 | Santos ......................... | 709/205 |
| 2005/0134682 A1* | 6/2005 | Sandler et al. ............ | 348/14.08 |
| 2005/0197877 A1* | 9/2005 | Kalinoski ....................... | 705/8 |
| 2008/0084831 A1* | 4/2008 | Sylvain ......................... | 370/260 |
| 2009/0262668 A1* | 10/2009 | Hemar et al. ................. | 370/260 |
| 2010/0220847 A1* | 9/2010 | Yap et al. ................ | 379/202.01 |
| 2011/0075826 A1* | 3/2011 | Block ....................... | 379/142.04 |
| 2011/0093548 A1* | 4/2011 | Das et al. ..................... | 709/206 |
| 2011/0106892 A1* | 5/2011 | Nelson et al. ................ | 709/206 |
| 2011/0135079 A1* | 6/2011 | Shah et al. .............. | 379/202.01 |
| 2012/0150956 A1* | 6/2012 | Tucker et al. ................ | 709/204 |

* cited by examiner

*Primary Examiner* — Abdulkader M Alriyashi
(74) *Attorney, Agent, or Firm* — The Mueller Law Office, P.C.

(57) ABSTRACT

A method for scheduling a meeting using an email client that is part of an email system includes receiving a request at the email client to schedule the meeting. The request may include an indication of the resources that are to be provided by a conferencing system for the meeting. The method also includes communicating the request to a conference bridge that is part of the conferencing system and receiving from the conference bridge an access code associated with the meeting. The method also includes appending the access code to a meeting invitation associated with the meeting and providing the meeting invitation to an email server that is part of the email system. The method also includes sending the meeting invitation to users invited to participate in the meeting.

2 Claims, 9 Drawing Sheets

SYNCHRONIZATION BETWEEN CONFERENCE AND CALENDAR SYSTEMS

FIELD OF THE INVENTION

The present invention relates generally to scheduling meetings using conferencing and calendaring systems and, more particularly, to methods and apparatuses that can be used to synchronize meeting schedules between separate conference and calendar systems.

BACKGROUND

In most corporate or group computing environments, an email system such as Microsoft Outlook or Lotus Notes is used that includes calendaring functionality. The calendaring functionality allows users to schedule meetings and organize their time. Integrating email and calendaring functions can improve ease of use and allow the email system to be used to enhance the calendaring functionality. For example, meeting invitations, changes to meetings, cancelation of meetings, and reminders of upcoming meetings can be sent seamlessly to invited participants using the email system. Look and feel of the email and the calendaring functions can also be integrated to improve user experience.

The calendaring functionality provided by most email systems, however, does not include support for conferencing resources such as audio, video, and/or web resources. These meeting resources are typically provided by a separate conferencing system that is often provided by a different company. Thus, while most users prefer to use the calendaring functionality provided by the email system to schedule meetings, these meetings must also be scheduled with a separate conferencing system. Use of the meeting resources is typically scheduled so that conferencing systems can ensure quality and availability. The conferencing system provides the meeting resources as well as information, such as dial-in numbers and codes, to access the resources. This information is often sent to meeting participants by email in a message separate from a meeting invitation. Because the email system (or calendaring system) and the conferencing system are separate, multiple steps are required to schedule a meeting on the email system and to schedule meeting resources on the conferencing system. Synchronization between the systems can also be a problem if a meeting is modified or deleted on one system but not the other.

Thus, there is a general need in the art for improved methods and apparatuses for scheduling meetings when using separate email and conferencing systems.

SUMMARY

Some embodiments of the present invention provide improved methods and apparatuses for scheduling meetings when using separate email (or calendaring) and conferencing systems. In accordance with an embodiment, for example, a method is provided for scheduling a meeting using an email client that is part of an email system, where the meeting is scheduled to use resources provided by a conferencing system that is separate from the email system. The method includes receiving a request at the email client to schedule the meeting. The request may be generated, for example, by a user of the email system. The request may include a schedule for the meeting (e.g., date, time, meeting length, etc.) and an indication of the resources that are to be provided by the conferencing system for the meeting. The method also includes communicating the request to a conference bridge that is part of the conferencing system and receiving from the conference bridge an access code associated with the meeting. The method also includes appending the access code to a subject line of a meeting invitation associated with the meeting and providing the meeting invitation including the access code to an email server that is part of the email system. The method also includes sending the meeting invitation including the access code to users invited to participate in the meeting.

In one embodiment, the request is communicated to the conference bridge using a plug-in associated with the email client.

In another embodiment, the request is communicated to the conference bridge via an email message, the email message sent using the email client.

Numerous benefits are achieved using embodiments of the present invention over conventional techniques. For example, some embodiments provide methods for scheduling meetings where an email system communicates meeting requests to a conference bridge. The meeting requests may be communicated using a plug-in associated with an email client. This allows meetings to be scheduled on both the email system and the conferencing system. Other embodiments provide methods for receiving lists of scheduled meetings from an email server. This allows a conference bridge to determine if a scheduled meeting has been changed or deleted so that synchronization can be maintained between the systems. Depending on the embodiment, one or more of these benefits may exist. These and other benefits are described throughout the specification and more particularly below.

DETAILED DESCRIPTION

Embodiments of the present invention provide improved methods and apparatuses for scheduling and synchronizing meetings between separate email (or calendaring) and conferencing systems. Most email systems provide limited calendaring functionality. The calendaring functionality is intended primarily to allow users to schedule meetings and organize their time. Most conferencing systems provide similar calendaring functionality and also provide additional resources to enhance meetings and improve user efficiency. These resources may include audio and/or video resources such as conferencing and recording, web resources such as desktop sharing, and the like.

Despite the resources provided by conferencing systems, most users prefer to use their email system for routine calendaring tasks such as scheduling meetings. Many of the meetings scheduled by a user do not require resources provided by a conferencing system. For those meetings that do require additional resources, however, embodiments of the present invention enable communication between the email and conferencing systems. This allows for details about a meeting that is scheduled using an email system, including any resources required for the meeting, to be communicated to the conferencing system with little or no additional user input. This simplifies the scheduling process and improves user experience.

Figure 1:
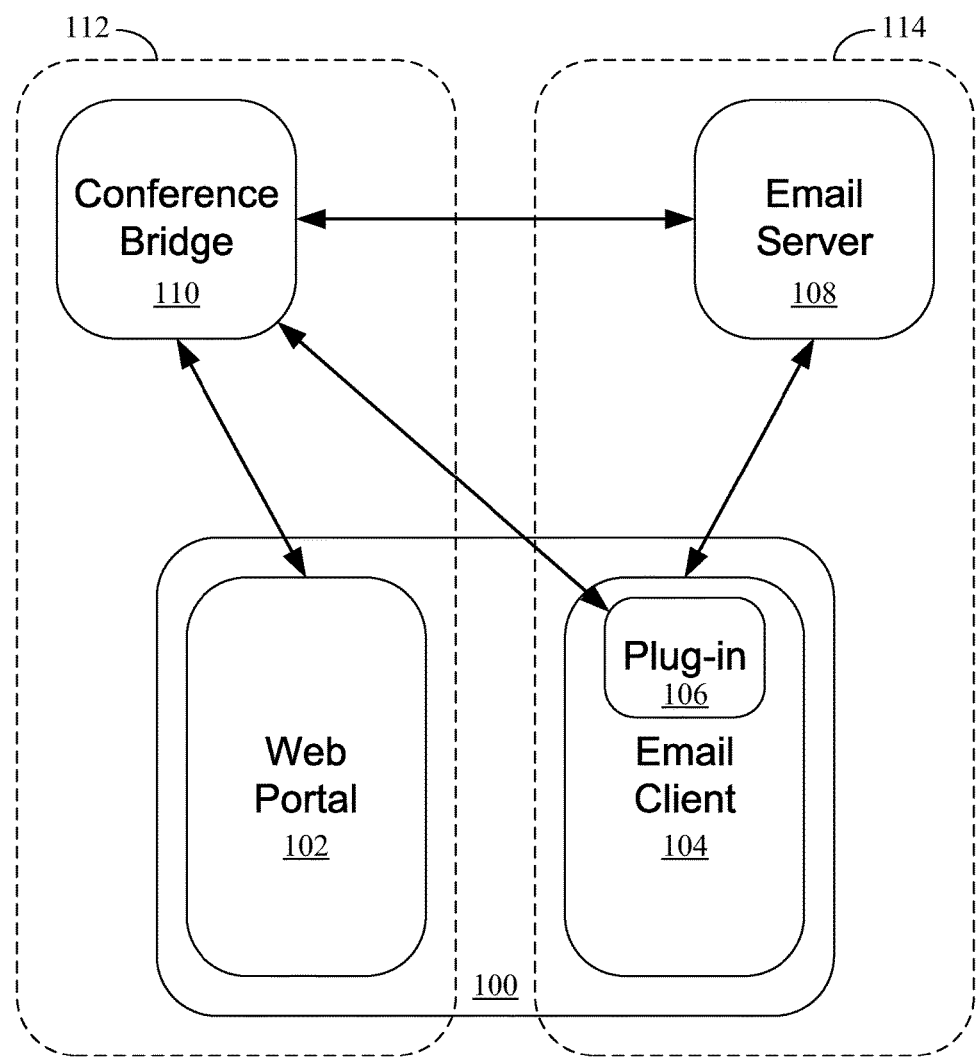
FIG. 1 is a simplified diagram of an email system and a conferencing system in accordance with an embodiment of the invention.

FIG. 1 is a simplified diagram of an email system 114 and a conferencing system 112 in accordance with an embodiment of the invention. It should be appreciated that the simplified diagrams used in this application are intended to provide an exemplary high-level configuration that includes the components necessary to describe and enable embodiments of the invention. It should also be appreciated that, in light of the present disclosure, embodiments of the invention may be used with systems having different configurations and/or different components. Further, the components illustrated may represent physical and/or functional components or groupings of components in actual systems.

The email system 114 shown in FIG. 1 includes an email client 104 and an email server 108. This client-server configuration is typical of many email systems used in group computing environments. For example, Microsoft Outlook is a common email client used with Microsoft Exchange Servers. Similarly, Lotus Notes is a common email client used with IBM Lotus Domino servers. These email systems are typically configured to provide email, calendaring, and other applications to users. In most email systems, one or more email servers support a number of email clients. The email client 104 is typically a software component running on a computing device such as PC 100.

The conferencing system 112 shown in FIG. 1 includes a web portal 102 and a conference bridge 110. This is similar to the client-server configuration of the email system 114. The conference bridge 110 is typically a server that is configured to provide meeting resources and applications. The meeting resources may include audio, video, and web resources; and the applications may include calendaring functions. In most conferencing systems, a number of web portals access one or more conference bridges. The web portal 102 provides an interface to the applications on the conference bridge 110. For example, the web portal 102 can be used to schedule meetings that may or may not use meeting resources provided by the conference bridge 110. The web portal 102 is typically a software component, such as a browser, running on the PC 100.

As shown by arrows in FIG. 1, the email client 104 and the email server 108 are configured to communicate with each other, the web portal 102 and the conference bridge 110 are configured to communicate with each other, the conference bridge 110 and the email server 108 are configured to communicate with each other, and a plug-in 106 and the conference bridge 110 are configured to communicate with each other. The plug-in 106 is associated with the email client 104 and enables communications between the email client 104 and the conference bridge 110. The plug-in 106 is typically a set of software components that enable the communications. The plug-in 106 may be created in accordance with known techniques, and each of the components may communicate using known protocols and techniques.

Using the configuration shown in FIG. 1, a user can schedule a meeting using the web portal 102 or the email client 104. For each meeting that is scheduled and that requires meeting resources provided by the conference bridge 110 (e.g., audio, video, and/or web resources), the conference bridge 110 can generate an access code associated with the meeting. Access codes are commonly used as a means to allow users to access resources provided by a conferencing system. An access code may include one or more dial-in numbers for a meeting; codes for hosts, moderators, and/or participants of a meeting; meeting identifiers; uniform resource identifiers (URIs) associated with the meeting; and the like. Most web portals and email clients include means that allow users to specify or select the meeting resources required for a particular meeting (e.g., check boxes, buttons, and/or drop-down menus on a graphical user interface).

For meetings that require meeting resources and are scheduled using the web portal 102, the conference bridge 110 can generate an access code associated with each meeting. The conference bridge 110 can save the access code and a meeting schedule (e.g., meeting date and time, length of meeting, required resources, host, participants, and the like) in memory. The conference bridge 110 can also communicate the meeting schedule and the associated access code to the email server 108. The meeting schedule and the associated access code can be saved in memory at the email server 108 and communicated to meeting participants (e.g., via email message). The email server 108 can provide the meeting schedule and the associated access code to the email client 104 so that it appears on a user's calendar.

For meetings that require meeting resources and are scheduled using the email client 104, meeting requests can be communicated to the conference bridge 110 via the plug-in 106. This allows the conference bridge 110 to receive near real-time notification of meetings that require meeting resources. The conference bridge 110 can generate an access code associated with each meeting and save the meeting schedule and the associated access code in memory. The conference bridge 110 can also communicate the access code to the email client 104 via the plug-in 106. The email client 104 can communicate the meeting schedule and the associated access code to meeting participants (e.g., via email message). The email client 104 can also communicate the meeting schedule and the associated access code to the email server 108, where the meeting schedule and the associated access code can be saved in memory.

The configuration shown in FIG. 1 also allows the conference bridge 110 to receive notification when a scheduled meeting is modified or deleted. Modifications may include changes in meeting date, time, resources, or the like. When a scheduled meeting is modified or deleted using the web portal 102, the conference bridge 110 can communicate these changes to the email server 108. When a scheduled meeting is modified or deleted using the email client 104, the changes can be communicated to the conference bridge 110 via the plug-in 106. This helps maintain synchronization between the email system 114 and the conferencing system 112 so that scheduled meetings are the same in both systems.

Figure 2:
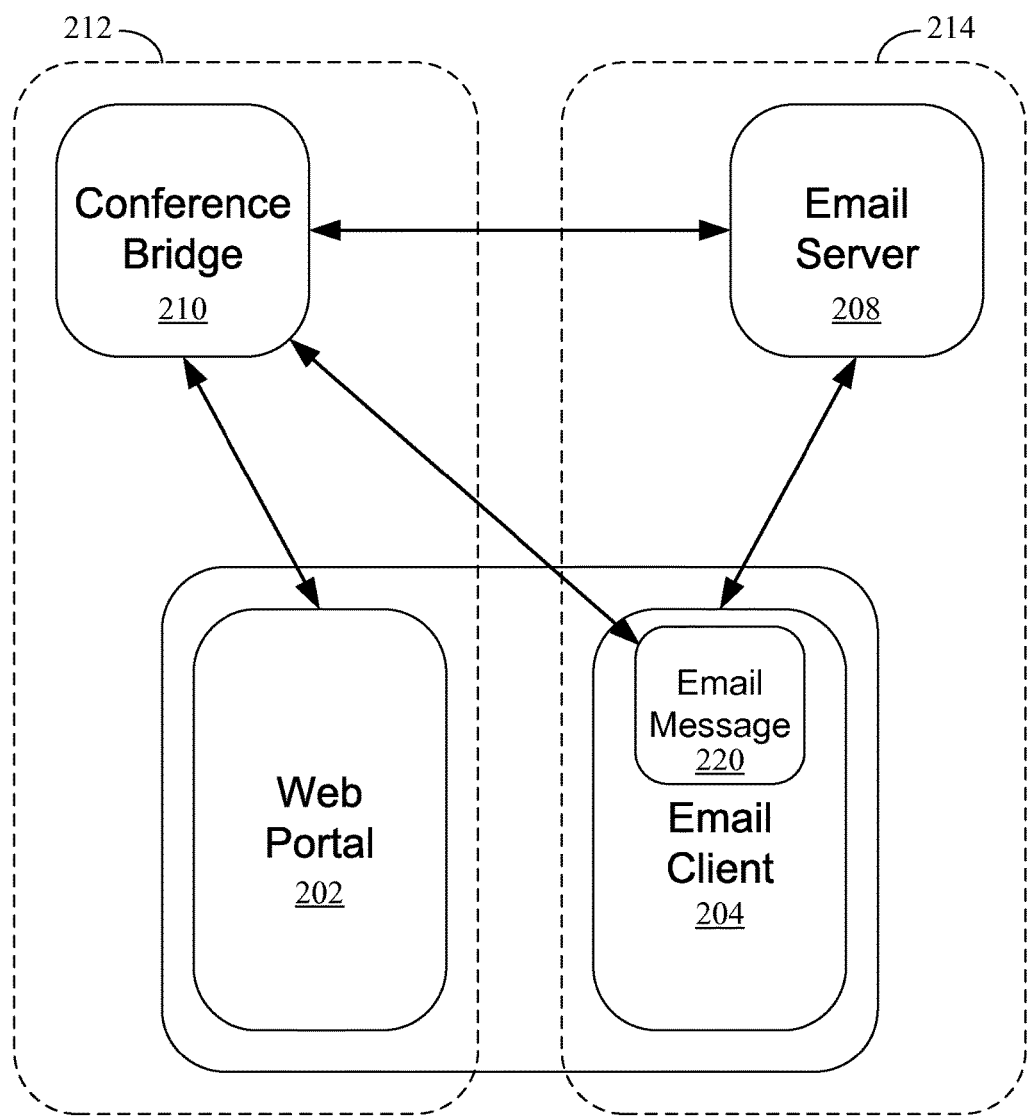
FIG. 2 is a simplified diagram of an email system and a conferencing system in accordance with another embodiment of the invention.

FIG. 2 is a simplified diagram of an email system 214 and a conferencing system 212 in accordance with another embodiment of the invention. The configuration shown in this embodiment is similar to that shown in FIG. 1, with the plug-in 106 being replaced with an email message 220. Other components of the email system 214, including email server 208 and email client 204, as well as the components of the conferencing system 212, are similar to the corresponding components illustrated in FIG. 1 and will not be described separately.

In this embodiment, the email client 204 and conference bridge 210 are configured to communicate via one or more email messages 220. This configuration may be used in lieu of the plug-in configuration shown in FIG. 1, in conjunction with the plug-in configuration shown in FIG. 1, or it may be used with email clients that do not support plug-ins.

For meetings that require meeting resources and are scheduled using the web portal 202, the conference bridge 210 can generate an access code and communicate the meeting schedule and the associated access code to the email server 208 in a manner similar to that described above with regard to FIG. 1.

For meetings that require meeting resources and are scheduled using the email client 204, meeting requests can be communicated to the conference bridge 210 via the email message 220. This allows the conference bridge 210 to receive near real-time notification of meetings that require meeting resources. The conference bridge 210 can generate an access code associated with each meeting and save the meeting schedule and the associated access code in memory. The conference bridge 210 can also communicate the access code to the email client 204 via the email message 220 (e.g., a return email message). The email client 204 can communicate the meeting schedule and the associated access code to the email server 208 and to meeting participants (e.g., via email message). The meeting schedule and the associated access code can be saved in memory at the email server 208.

The configuration shown in FIG. 2 also allows the conference bridge 210 to receive notification when a scheduled meeting is modified or deleted. When a scheduled meeting is modified or deleted using the web portal 202, the conference bridge 210 can communicate these changes to the email server 108. When a scheduled meeting is modified or deleted using the email client 204, the changes can be communicated to the conference bridge 210 via the email message 220. This helps maintain synchronization between the email system 214 and the conferencing system 212 so that scheduled meetings are the same in both systems.

The different configurations illustrated in FIGS. 1-2 lead to some differences in scheduling meetings using an email client. For example, in FIG. 1 the plug-in 106 may be configured to automatically communicate with the conference bridge 110 based on user inputs during creation of a meeting invitation. These inputs may include selection of meeting resources that will be provided by the conference bridge 110. The plug-in 106 may also be configured to automatically provide an access code received from the conference bridge 110 to the email client 104 where it can be appended to the meeting invitation. Alternatively, the plug-in 106 may be configured to automatically append the access code to the meeting invitation. For example, the access code (or a portion of the access code) may be appended to the meeting invitation (e.g., appended to a subject line of the meeting invitation, a body of the meeting invitation, or the like). In an embodiment, the access code (or a portion of the access code) may be appended within brackets or the like to facilitate identification of the access code. Appending the access code to the meeting invitation provides a means of associating meeting schedules and access codes. This can be used to distinguish meetings that require meeting resources from meetings that do not require meeting resources.

In the configuration illustrated in FIG. 2, an email address of the conference bridge 210 may be added to a meeting invitation to provide the email message 220 to the conference bridge 210. For example, a user may add the conference bridge 210 (or an email address associated with the conference bridge 210) to the meeting invitation. The conference bridge 210 may be configured to receive the meeting invitation via the email message 220 and to schedule a meeting based on information included with the meeting invitation. The information may include required meeting resources, meeting date, meeting time, meeting duration, and the like. The conference bridge 210 may generate an access code associated with the meeting and communicate the access code (or a portion of the access code) to the user via a return email message. The conference bridge 210 may also communicate the access code to invited participants of the meeting. Alternatively, the email client 204 or email server 208 may communicate the access code to the invited participants of the meeting. The access code provided to a meeting host or leader may include additional or different information such as a host access code. One of ordinary skill in the art would recognize many variations, modifications, and alternatives in light of the present disclosure.

Figure 3:
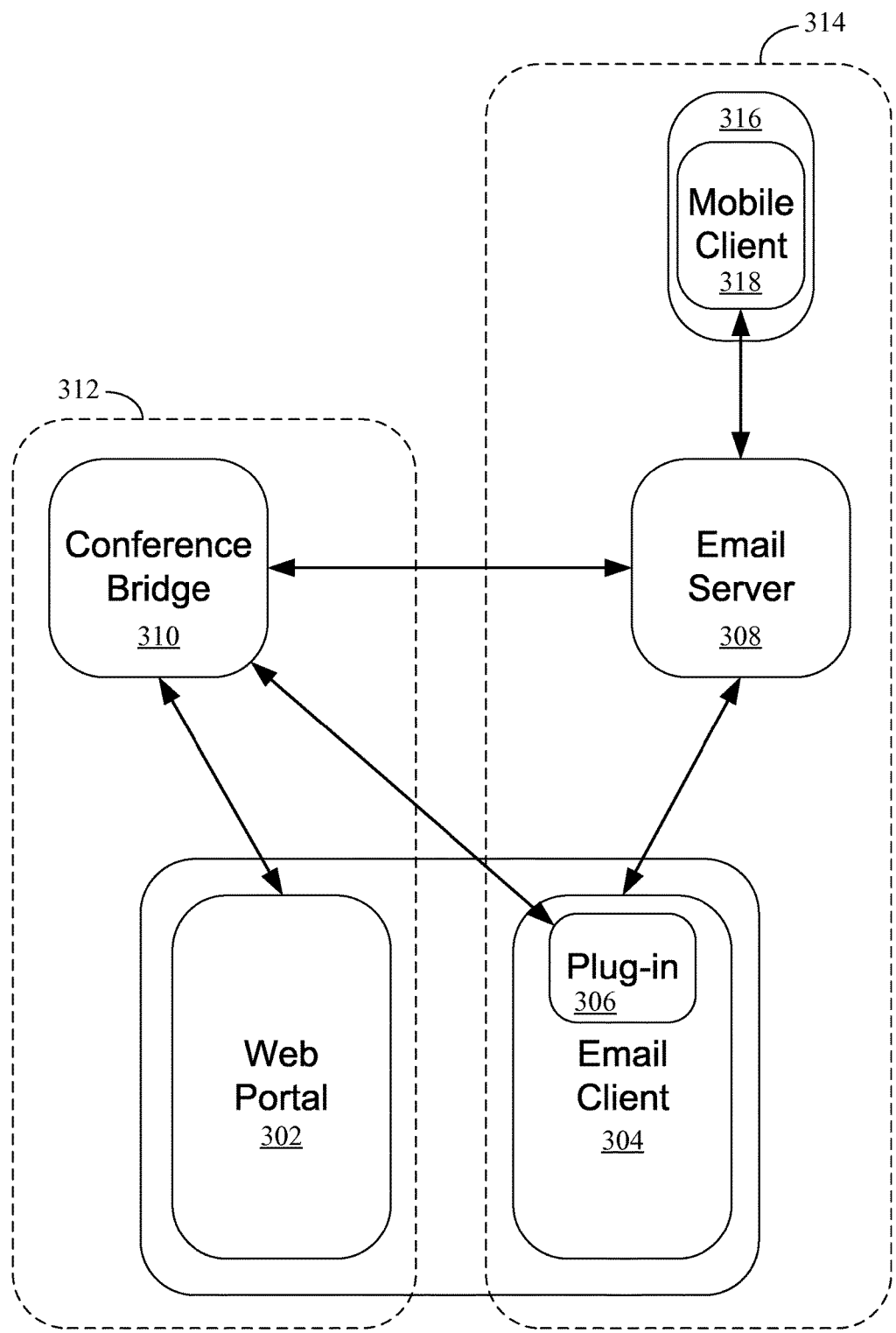
FIG. 3 is a simplified diagram of an email system and a conferencing system in accordance with yet another embodiment of the invention.

FIG. 3 is a simplified diagram of an email system 314 and a conferencing system 312 in accordance with yet another embodiment of the invention. The configuration shown in this embodiment is similar to that shown in FIG. 1 with the addition of a mobile client 318 running on a mobile device 316. The mobile device may be a laptop, mobile phone, or the like. The other components of the email system 314, including email server 308, email client 304, and plug-in 306, as well as the components of the conferencing system 312, including conference bridge 310 and web portal 302, are similar to the corresponding components illustrated in FIG. 1 and will not be described separately. Although the configuration illustrated in FIG. 3 includes the plug-in 306, it should be appreciated that the email client 304 and the conference bridge 310 may also utilize email messages for communications in a manner similar to that described above with regard to FIG. 2.

The mobile client 318 may be, for example, a Microsoft Windows Mobile Outlook Client, a Microsoft Windows Outlook Web App, or the like. Most mobile clients provide limited functionality and do not support plug-ins that enable communications between the mobile client 318 and conference bridge 310. As shown by arrow in FIG. 3, however, the mobile client 318 is typically configured to communicate with the email server 308.

Scheduled meetings that are modified or deleted using the mobile client 318 are communicated to the email server 308. The conference bridge 310 may receive notification of these changes through periodic or random polling of the email server 308 or by subscription to a notification service provided by the email server 308. In an embodiment, for example, the conference bridge receives a list of scheduled meetings from the email server 308. The list may include scheduled meetings that require meeting resources provided by the conference bridge 310 as well as scheduled meetings that do not require additional meeting resources. The conference bridge 310 can distinguish between the meetings based on access codes. The scheduled meetings that require meeting resources have an associated access code, whereas the scheduled meetings that do not require meeting resources do not have an associated access code. Using the access codes, the conference bridge 310 can compare schedules of the meetings on the list with the schedules of the same meetings that are saved in memory at the conference bridge 310. Any differences can be presumed to be made using a device or component that is unable to communicate with the conference bridge 310, such as the mobile client 318, and the conference bridge 310 can update the schedules and save the updated schedules in memory.

In actual email and conferencing systems, there may be a number of conference bridges and email servers. The email servers in the email system are typically configured to communicate with each other to maintain synchronization between them. Similarly, the conference bridges in the conferencing system are typically configured to communicate with each other to maintain synchronization between them. In both cases, maintaining synchronization can improve quality of service. In an embodiment, one of the conference bridges in the conferencing system communicates with one or more of the email servers through periodic or random polling of the email server or by subscription to a notification service provided by the email server. This can reduce network traffic that would result if each conference bridge were to communicate directly with each email server.

Determining which conference bridge communicates with the one or more email servers can be performed using methods described in U.S. patent application Ser. No. 12/975,679, filed Dec. 22, 2010, the contents of which are incorporated herein by reference in their entirety for all purposes. The conference bridge that communicates with the one or more email servers can receive one or more lists of scheduled meetings from the email servers. These lists can be used as described above to determine if scheduled meetings have been modified or deleted. The conference bridge can determine if scheduled meetings have been modified or deleted for each of the other conference bridges in the conferencing system, or it can provide the one or more lists to the other conference bridges and the determination can be made individually. Methods for efficiently providing the lists to the other conference bridges in the conferencing system can also be found in U.S. patent application Ser. No. 12/975,679.

Figure 4:
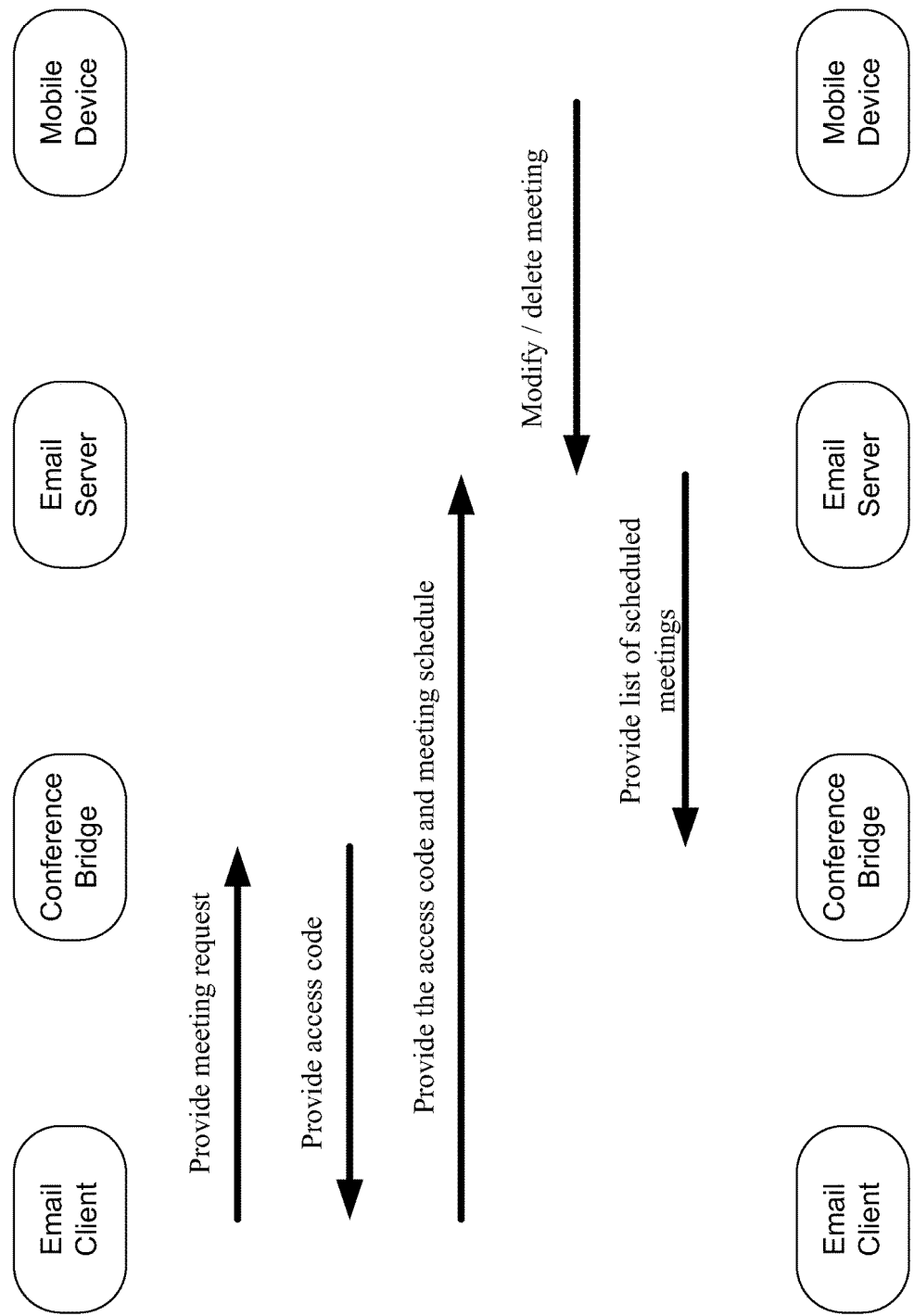
FIG. 4 is a simplified diagram illustrating communications between components of an email system and a conferencing system in accordance with an embodiment of the invention.

FIG. 4 is a simplified diagram illustrating communications between components of an email system and a conferencing system in accordance with an embodiment of the invention. The components include an email client, a conference bridge, an email server, and a mobile device. Beginning with the top arrow in the figure, the email client provides a meeting request to the conference bridge. The meeting request may be in response to a command from a user who wishes to schedule a meeting. The meeting request may be generated by the email client. The meeting request may be communicated to the conference bridge via a plug-in associated with the email client, via an email message, or via similar communication means.

In response to the meeting request, the conference bridge generates an access code associated with the meeting request and provides the access code to the email client. The access code may be provided via a plug-in associated with the email client, via an email message, or via similar communications means.

After receiving the access code, the email client provides the access code and the associated meeting schedule to the email server, where the access code the and associated meeting schedule may be saved to memory.

The mobile device can modify or delete scheduled meetings that are saved at the email server. Because the mobile device is generally not configured to communicate with the conference bridge, these changes are not communicated directly to the conference bridge. The conference bridge may, however, receive a list of scheduled meetings from the email server and compare schedules of the meetings on the list with schedules of the same meetings saved at the conference bridge. The conference bridge may identify the meetings that are the same using access codes associated with the meetings. The conference bridge can make necessary updates to the schedules saved at the conference bridge based on the differences.

Figure 5:
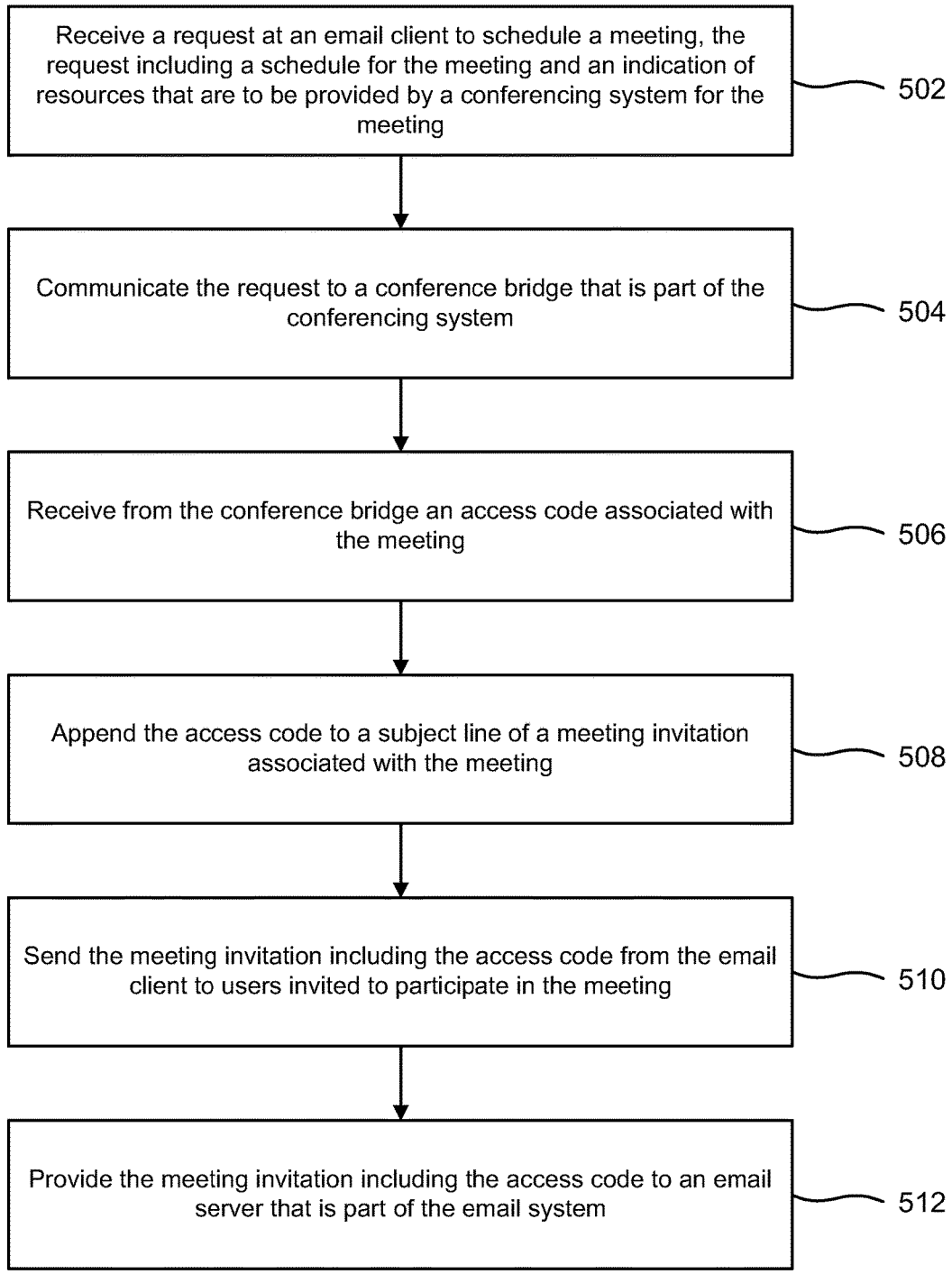
FIG. 5 is a simplified flowchart illustrating an exemplary method of scheduling a meeting using an email client that is part of an email system in accordance with an embodiment of the invention.

FIG. 5 is a simplified flowchart illustrating an exemplary method of scheduling a meeting using an email client that is part of an email system in accordance with an embodiment of the invention. The method includes receiving a request at the email client to schedule the meeting, where the request includes a schedule for the meeting and an indication of the resources that are to be provided by the conferencing system for the meeting (502). The request may be generated, for example, by a user of the email system. The method also includes communicating the request to a conference bridge that is part of the conferencing system (504). In an embodiment, the request is communicated to the conference bridge using a plug-in associated with the email client. In another embodiment, the request is communicated to the conference bridge via an email message sent using the email client. The method also includes receiving from the conference bridge an access code associated with the meeting (506). In an embodiment, the request is received from the conference bridge using a plug-in associated with the email client. In another embodiment, the request is received from the conference bridge via an email message from the conference bridge. The method also includes appending the access code to a subject line of a meeting invitation associated with the meeting (508). In an embodiment, the access code is appended to the subject line of the meeting invitation by the plug-in. The method also includes providing the meeting invitation including the access code to an email server that is part of the email system (510). The method also includes sending the meeting invitation including the access code to users invited to participate in the meeting (512).

Figure 6:
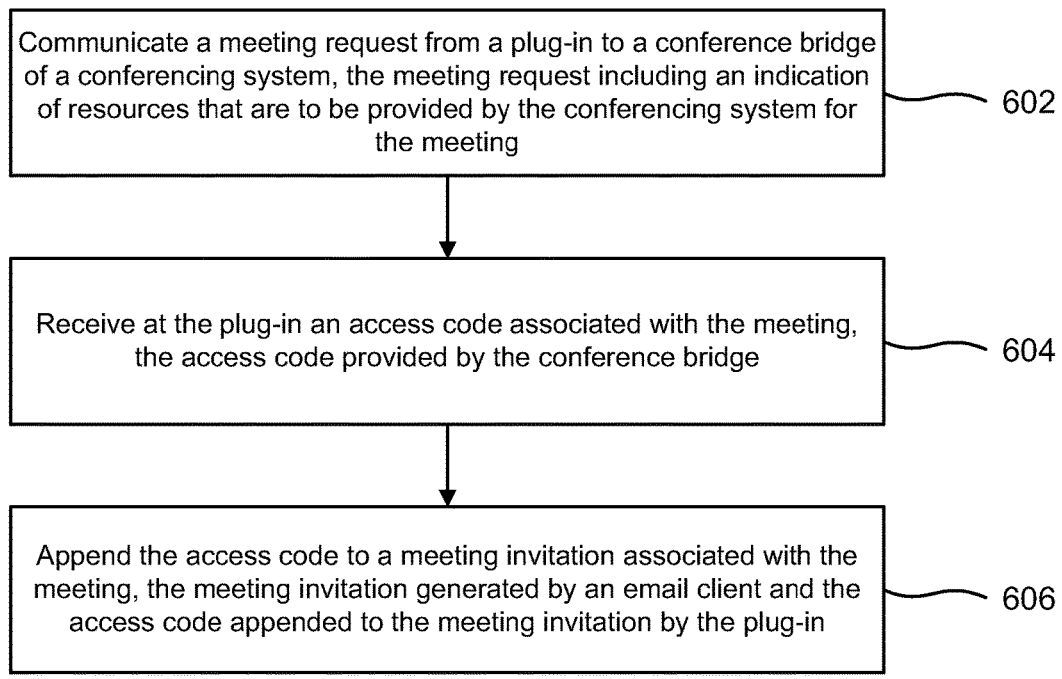
FIG. 6 is a simplified flowchart illustrating an exemplary method of scheduling a meeting using a plug-in associated with an email client of an email system in accordance with an embodiment of the invention.

FIG. 6 is a simplified flowchart illustrating an exemplary method of scheduling a meeting using a plug-in associated with an email client of an email system in accordance with an embodiment of the invention. The method includes communicating a meeting request from the plug-in to a conference bridge of the conferencing system, where the meeting request includes an indication of the resources that are to be provided by the conferencing system for the meeting (602). In an embodiment, the request may also include a schedule for the meeting. The method also includes receiving at the plug-in an access code associated with the meeting, where the access code is provided by the conference bridge (604). The method also includes appending the access code to a meeting invitation associated with the meeting, where the meeting invitation is generated by the email client and the access code is appended to the meeting invitation by the plug-in (606).

Figure 7:
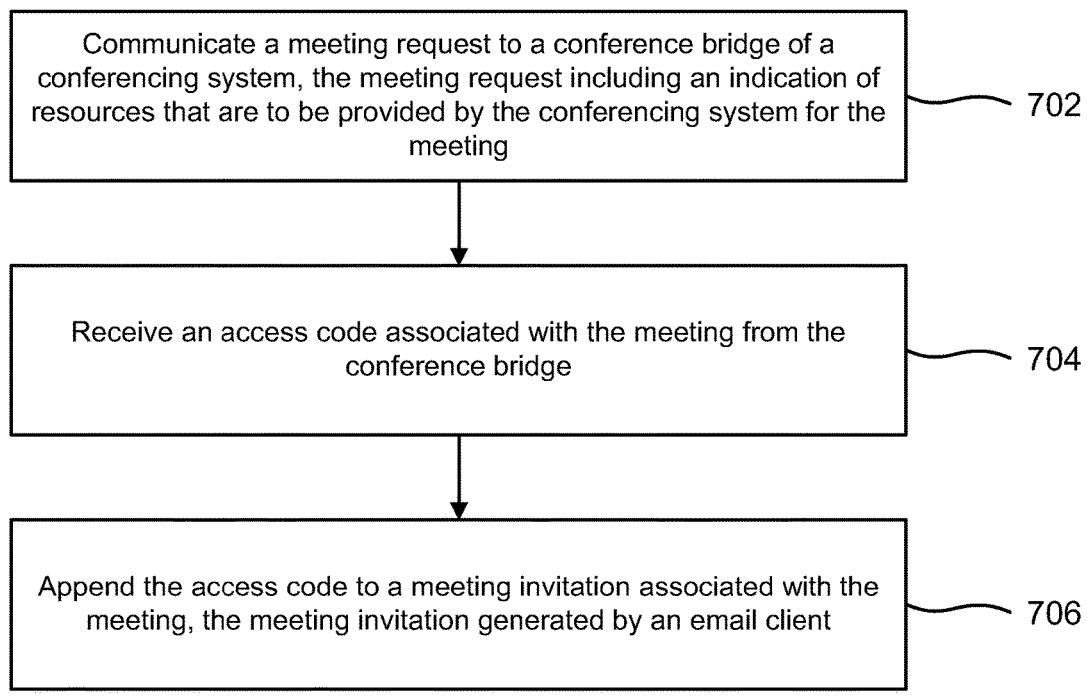
FIG. 7 is a simplified flowchart illustrating an exemplary method of scheduling a meeting using an email client that is part of an email system in accordance with an embodiment of the invention.

FIG. 7 is a simplified flowchart illustrating an exemplary method of scheduling a meeting using an email client that is part of an email system in accordance with an embodiment of the invention. The method includes communicating a meeting request to a conference bridge of the conferencing system, where the meeting request includes an indication of the resources that are to be provided by the conferencing system for the meeting (702). In an embodiment, the request is communicated to the conference bridge via an email message. The method also includes receiving an access code associated with the meeting from the conference bridge (704). In an embodiment, the request is received from the conference bridge via an email message. The method also includes appending the access code to a meeting invitation associated with the meeting, where the meeting invitation is generated by the email client (706).

Figure 8:
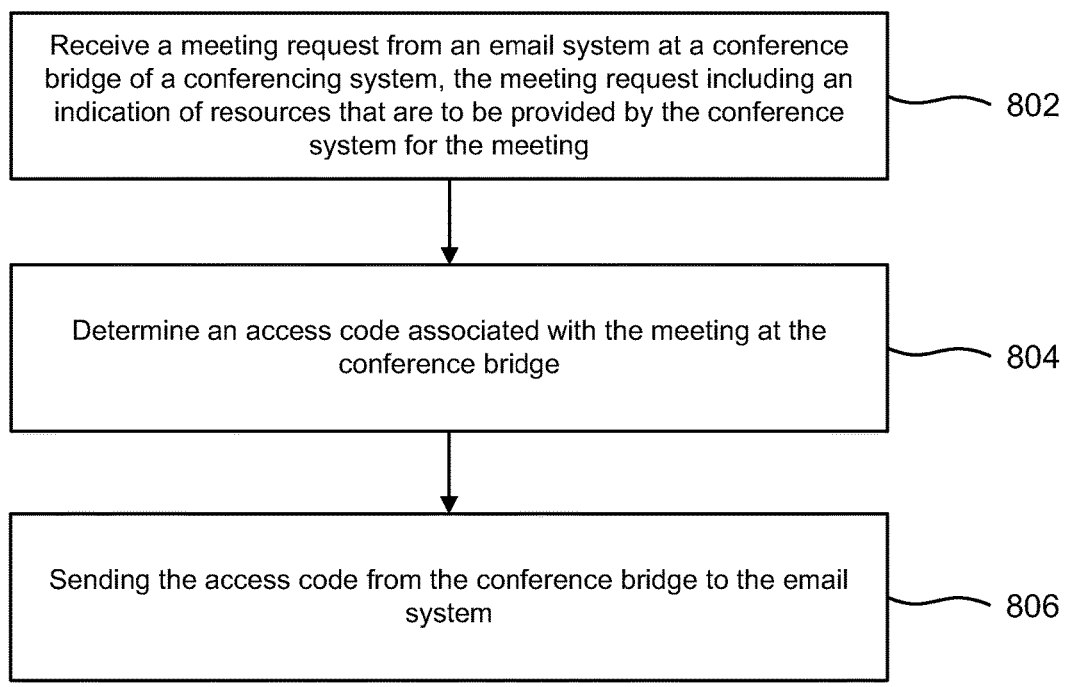
FIG. 8 is a simplified flowchart illustrating an exemplary method of scheduling a meeting in accordance with an embodiment of the invention.

FIG. 8 is a simplified flowchart illustrating an exemplary method of scheduling a meeting in accordance with an embodiment of the invention. The method includes receiving a meeting request from the email system at a conference bridge of the conferencing system, where the meeting request includes an indication of the resources that are to be provided by the conference system for the meeting (802). The method also includes determining an access code associated with the meeting at the conference bridge (804). The method also includes sending the access code from the conference bridge to the email system (806). In an embodiment, the method also includes receiving a list of scheduled meetings from an email server of the email system, determining that a schedule of one or more of the scheduled meetings on the list is different from the schedule of the one or more of the scheduled meetings at the conference bridge, and updating the schedule of the one or more of the scheduled meetings at the conference bridge based on the schedule of the one or more of the scheduled meetings on the list. In another embodiment, the method also includes identifying the scheduled meetings on the list that are associated with access codes, where the scheduled meetings associated with access codes form a second list, and determining that the schedule of one or more of the scheduled meetings on the second list is different from the schedule of the one or more of the scheduled meetings at the conference bridge.

It should be appreciated that the specific steps illustrated in FIGS. 5-8 provide particular methods of scheduling meetings according to some embodiments of the present invention. Other sequences of steps may also be performed according to alternative embodiments. For example, alternative embodiments of the present invention may perform the steps outlined above in a different order. Moreover, the individual steps illustrated in FIGS. 5-8 may include multiple sub-steps that may be performed in various sequences as appropriate to the individual step. Furthermore, additional steps may be added or removed depending on the particular application.

Figure 9:
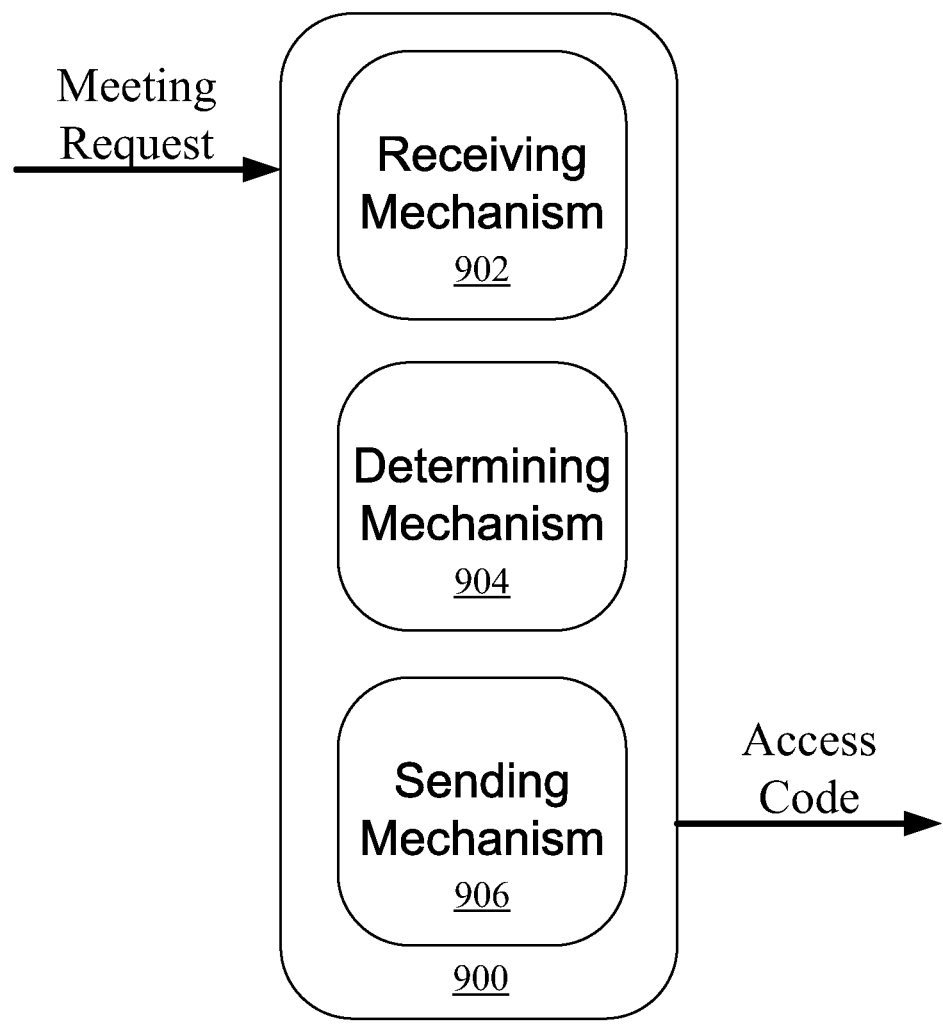
FIG. 9 is a simplified block diagram of an apparatus for scheduling a meeting in accordance with an embodiment of the invention.

FIG. 9 is a simplified block diagram of an apparatus 900 for scheduling a meeting in accordance with an embodiment of the invention. The apparatus 900 may be a conference bridge or a software or hardware component incorporated in a conference bridge. For example, a conference bridge in accordance with an embodiment of the invention may include one or more of the mechanisms shown in the apparatus 900 and described below. The apparatus 900 includes a receiving mechanism 902. The receiving mechanism 902 may be configured to receive a meeting request from an email system. The meeting request may include a schedule for a meeting and/or an indication of meeting resources that are to be provided by a conferencing system for the meeting. The apparatus 900 also includes a determining mechanism 904. The determining mechanism 904 may be configured to determine an access code associated with the meeting. In configurations that include more than one conference bridge in the conferencing system, the determining mechanism 904 may also be configured to determine which conference bridge communicates with one or more of email servers. The apparatus 900 also includes a sending mechanism 906. The sending mechanism 906 may be configured to send the access code to the email system.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for scheduling a meeting, the method comprising:
   receiving a meeting request at a conference bridge of a conferencing system, the meeting request received at the conference bridge directly from an email client of an email system, the meeting request received directly from the email client using a plug-in associated with the email client, the meeting request specifying resources that are to be used during the meeting by the conferencing system, wherein a computing platform of the email system is different from a computing platform of the conferencing system, the email system comprises one or more email servers, and the conferencing system comprises a plurality of conference bridges;
   at the conference bridge, determining an access code associated with the meeting;
   sending the access code from the conference bridge directly to the email system;
   receiving a list of scheduled meetings from an email server of the email system, wherein one of the plurality of conference bridges receives the list of the scheduled meetings directly from the email server of the email system;
   at the conference bridge, identifying scheduled meetings on the list that are associated with access codes, the scheduled meetings associated with access codes forming a second list that includes the meeting;
   at the conference bridge, determining that a schedule of the meeting on the second list is different from a schedule of the meeting at the conference bridge;
   at the conference bridge, updating the schedule of the meeting at the conference bridge based on the schedule of the meeting on the second list; and communicating updates to the schedule of the meeting at the conference bridge to one or more of remaining conference bridges of the plurality of conference bridges.

2. The method of claim 1 wherein the schedule of the meeting on the second list is different from the schedule of the meeting at the conference bridge as a result of a change to the schedule of the meeting on the second list using a mobile client.

\* \* \* \* \*